United States Patent
Djavadkhani et al.

(10) Patent No.: US 11,143,224 B1
(45) Date of Patent: Oct. 12, 2021

(54) LATCH ASSEMBLY

(71) Applicant: MOTOROLA SOLUTIONS, INC., Chicago, IL (US)

(72) Inventors: Pedram Djavadkhani, Penang (MY); Weng Kong Hor, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/890,575

(22) Filed: Jun. 2, 2020

(51) Int. Cl.
 *H04M 1/02* (2006.01)
 *H04B 1/3883* (2015.01)
 *F16B 5/06* (2006.01)

(52) U.S. Cl.
 CPC ......... *F16B 5/0621* (2013.01); *H04M 1/0262* (2013.01)

(58) Field of Classification Search
 CPC ............ H04M 1/0202; H04M 1/0262; H04M 2001/0204; H04M 2220/30; H04M 1/026; H04M 1/0252; H04M 1/0254; H04B 1/3833; H04B 1/3883; F16B 5/06; F16B 5/0621
 See application file for complete search history.

(56) References Cited

U.S. PATENT DOCUMENTS

| | | |
|---|---|---|
| 5,535,437 A | 7/1996 | Karl et al. |
| 5,766,794 A | 6/1998 | Brunette et al. |
| 6,678,154 B2 | 1/2004 | DeLuga |
| 7,052,799 B2 * | 5/2006 | Zatezalo ............... H01M 50/24 429/97 |
| 7,824,792 B2 * | 11/2010 | Shi ....................... H01M 50/209 429/96 |
| 8,257,851 B2 * | 9/2012 | Tang ..................... H01M 50/20 429/97 |
| 9,716,257 B2 * | 7/2017 | Kong ................... H01M 50/267 |
| 9,844,158 B2 * | 12/2017 | Shi ....................... H04M 1/0262 |
| 10,294,693 B2 | 5/2019 | Kiger et al. |

(Continued)

FOREIGN PATENT DOCUMENTS

| | | |
|---|---|---|
| CN | 2917124 Y | 6/2007 |
| TW | 201209291 A | 3/2012 |

OTHER PUBLICATIONS

HP Development Company, "Removing and Replacing the Battery for HP Pavilion dv6-7000, dv6-7100 and HP Envy dv6-7200, dv6-7300 Notebook PCs," <https://support.hp.com/id-en/document/c03275308> web page publicly available as early as May 18, 2015.

(Continued)

*Primary Examiner* — Quochien B Vuong
(74) *Attorney, Agent, or Firm* — Michael Best & Friedrich LLP

(57) ABSTRACT

A latch assembly for latching a battery to a portable communication device includes a latch holder having an elongate body defining an axis, and a latch catch configured to be coupled to the latch holder and to slide linearly relative to the latch holder along the axis. The latch assembly additionally includes a latch spring configured to be coupled to both the latch holder and the latch catch to bias the latch catch along the axis, and a latch button configured to be coupled to the latch holder. The latch assembly additionally includes a latch pin configured to removably engage and disengage the latch holder to retain the latch assembly inside the portable communication device and allow removal of the latch assembly.

21 Claims, 9 Drawing Sheets

(56) References Cited

U.S. PATENT DOCUMENTS

2005/0205737 A1    9/2005  Phelps, III et al.
2011/0266814 A1*  11/2011  Huang ................ H04M 1/0262
                                                    292/129
2020/0259939 A1*  8/2020  Yan ..................... H04M 1/0262

OTHER PUBLICATIONS

International Search Report and Written Opinion for Application No. PCT/US2021/031819 dated Aug. 25, 2021 (14 pages).

* cited by examiner

LATCH ASSEMBLY

BACKGROUND OF THE INVENTION

Latch assemblies are commonly used with portable communication devices to releasably latch a battery to the portable communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
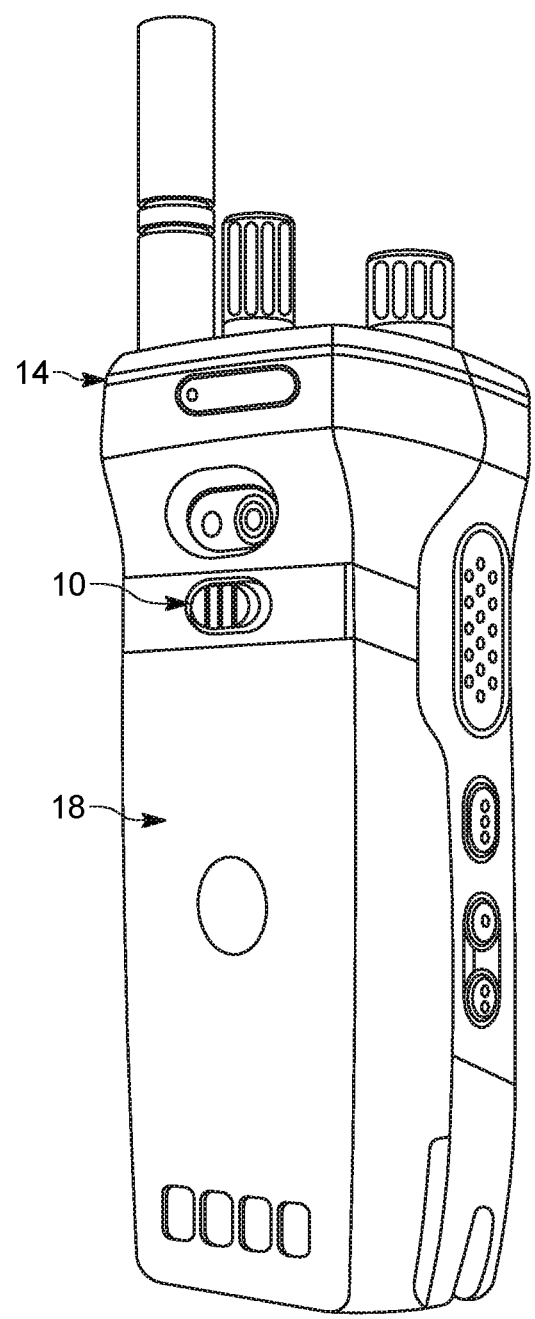
FIG. 1 is a perspective view of a latch assembly in accordance with one embodiment, installed on a back of a portable communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, latch assemblies are commonly used with portable communication devices to latch a battery to the portable communication device. Many latch assemblies are located on the battery. However, these latch assemblies require a significant amount of space that may otherwise be used for the battery itself. Additionally, a portable communication device may include an antenna. It is not desirable, however, for metal components on a latch assembly to be placed too closely to an antenna. Additionally, it is desirable to quickly and easily remove a latch assembly if necessary to repair and/or replace the latch assembly after use and wear. Accordingly, there is a need for an improved latch assembly that provides, among other things, a mechanism by which to easily install and remove the latch assembly from a portable communication device without interfering with antenna components of the portable communication device.

Briefly, there is provided herein an improved latch assembly for latching a battery to a portable communication device. The latch assembly, according to one embodiment, includes a latch holder having an elongate body defining an axis, and a latch catch configured to be coupled to the latch holder and to slide linearly relative to the latch holder along the axis. The latch assembly additionally includes a latch spring configured to be coupled to both the latch holder and the latch catch to bias the latch catch along the axis, and a latch button configured to be coupled to the latch holder. The latch assembly additionally includes a latch pin configured to removably engage and disengage the latch holder to retain the latch assembly inside the portable communication device and allow removal of the latch assembly.

FIG. 1 illustrates a latch assembly 10 on a portable communication device 14 (for example two-way radio) for latching a battery 18 to the portable communication device 14. While the latch assembly 10 described herein is for use with the portable communication device 14, the latch assembly 10 may be used on other devices, including other types of portable communication devices than that illustrated (for example cellular phones and the like). Additionally, the latch assembly 10 may be used to latch components other than the battery 18 to the portable communication device 14 or to other devices.

Figure 2:
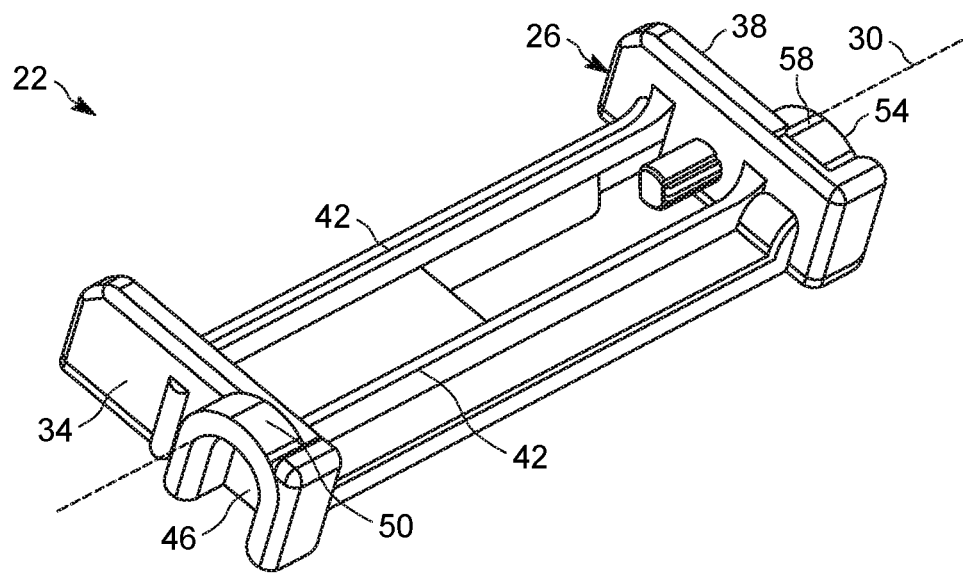
FIG. 2 is a perspective view of a latch holder of the latch assembly of FIG. 1.

With reference to FIG. 2, in the illustrated embodiment the latch assembly 10 includes a latch holder 22. The latch holder 22 has an elongate body 26 that defines an axis 30 (for example a longitudinal axis) that extends between a first end 34 and a second, opposite end 38 of the elongate body 26. The elongate body 26 of the latch holder 22 includes two rails 42 that extend parallel to each other and the axis 30. The first end 34 of the latch holder 22 includes a first recessed region 46 that is shaped and sized to receive a portion of a first latch pin (not illustrated) when the first latch pin is engaged with the latch holder 22. The first recessed region 46 is defined by a U-shaped protruding wall 50. The second end 38 of the latch holder 22 similarly includes a second recessed region 54 that is shaped and sized to receive a portion of a second latch pin (not illustrated) when the second latch pin is engaged with the latch holder 22. The second recessed region 54 is defined by a U-shaped protruding wall 58. Other embodiments include different shapes and sizes for the latch holder 22 than that illustrated. For example, in some embodiments the latch holder 22 has an elongate body 26 that is longer or shorter than that illustrated, or that includes more than two rails 42 or only a single rail 42. In some embodiments, the first recessed region 46 and/or the second recessed region 54 extend into other areas of the elongate body 26 rather than being defined by protruding U-shaped (or other-shaped) walls 50, 58.

Figure 3:
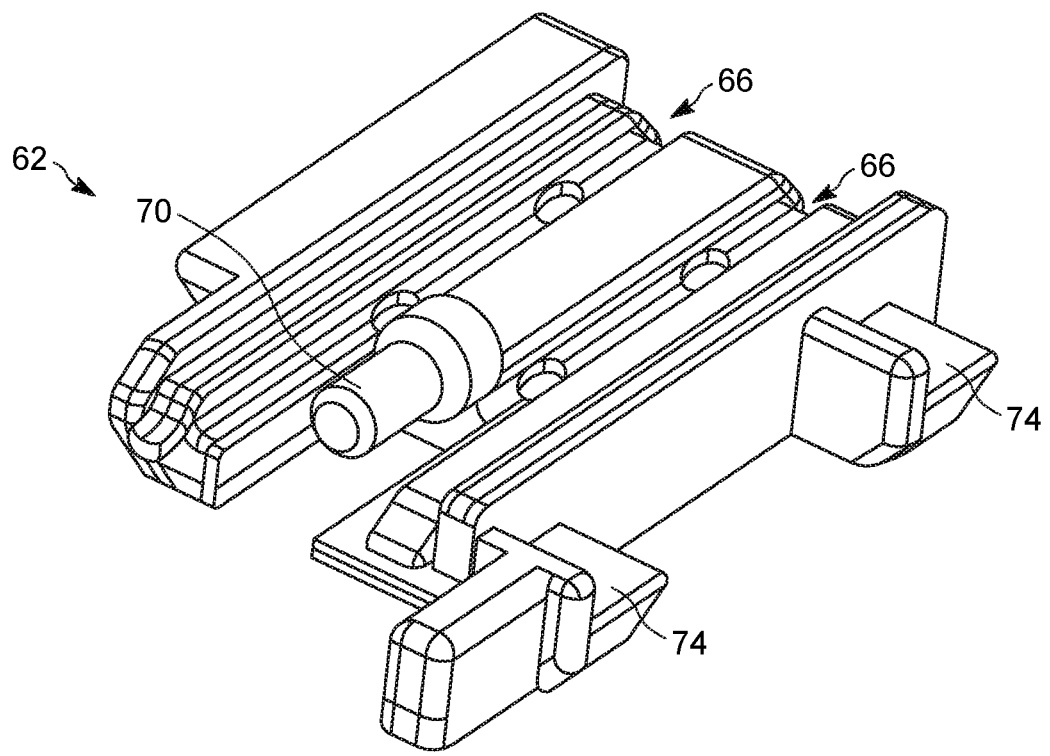
FIG. 3 is a perspective view of a latch catch of the latch assembly of FIG. 1.

With reference to FIG. 3, the latch assembly 10 additionally includes a latch catch 62 that couples to the latch holder 22 and slides linearly relative to the latch holder 22. In the illustrated embodiment, the latch catch 62 includes grooves 66 that receive the rails 42. During operation, the latch catch 62 slides along the rails 42. In other embodiments the latch catch 62 includes a rail or rails (like the rails 42), and the latch holder 22 includes a groove that receives the rail on the latch catch 62. As illustrated in FIG. 3, the latch catch 62 additionally includes an elongate protrusion 70 that is sized and shaped to receive a latch spring (not shown), and two interface protrusions 74 that extend laterally outwardly and are sized and shaped to engage with the battery 18. In the illustrated embodiment the latch catch 62 is comprised of metal, although in other embodiments the latch catch 62 is comprised of plastic (for example injection molded) or other suitable material.

Figure 4:
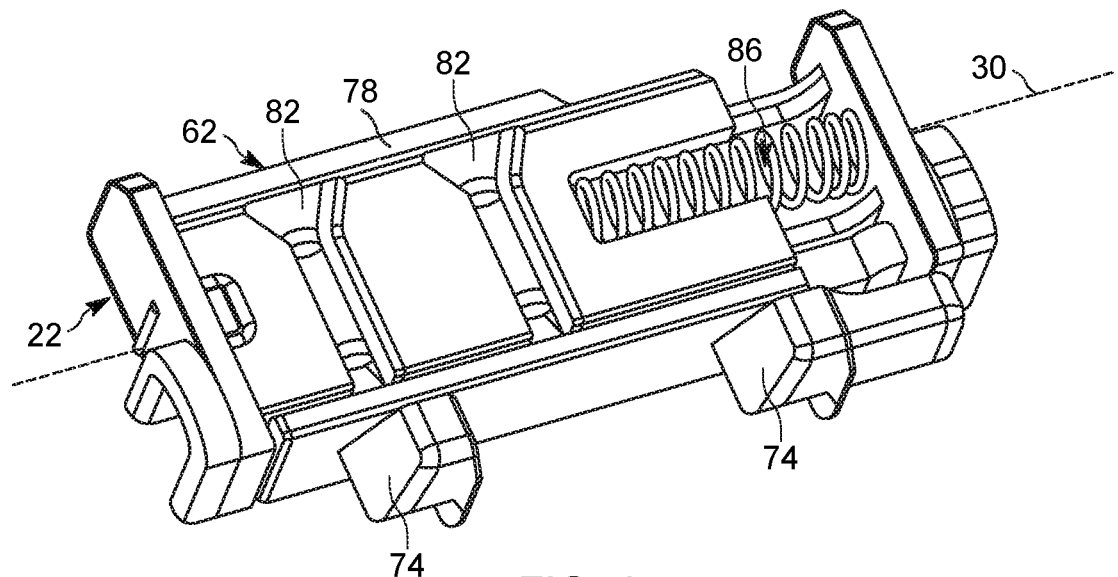
FIGS. 4 and 5 are perspective views of the latch assembly of FIG. 1, illustrating a latch spring coupled to both the latch holder and the latch catch.
Figure 5:
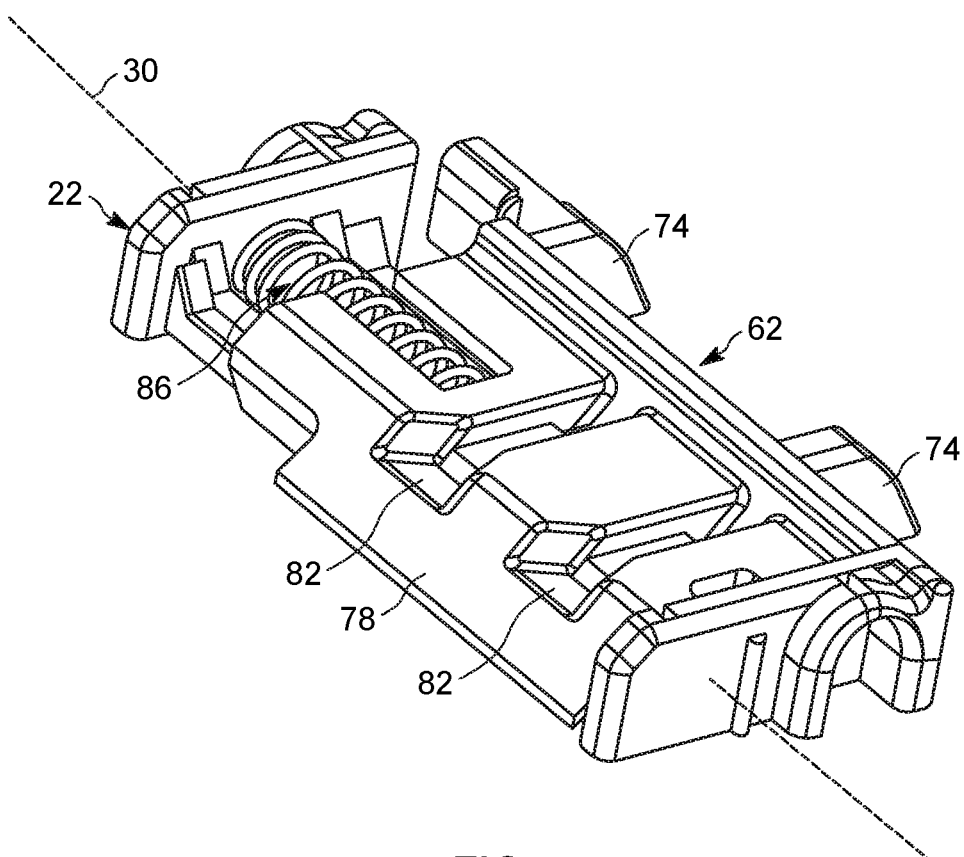

FIGS. 4 and 5 are perspective view of the latch assembly 10, illustrating a latch spring 86 coupled to both the latch holder 22 and the latch catch 62. With reference to FIGS. 4 and 5, the latch catch 62 additionally includes an inclined surface 78 that is located opposite the two interface protrusions 74, and two grooves 82 that extend to the inclined surface 78. Other embodiments include different shapes and sizes for the latch catch 62 than that illustrated. For example, in some embodiments the latch catch 62 includes more than two, or only a single, interface protrusion 74. In some embodiments the latch catch 62 does not include the elongate protrusion 70, or includes an elongate protrusion 70 having a different shape or size than that illustrated. Additionally, in some embodiments the latch catch 62 does not include the inclined surface 78, or the inclined surface 78 has a different angle of inclination than that illustrated. In some embodiments, the latch catch 62 includes ribs in place of the grooves 82.

With continued reference to FIGS. 4 and 5, one end of the latch spring 86 extends over the elongate protrusion 70. An opposite end of the latch spring 86 is coupled (for example fixed) to the latch holder 22. As illustrated in FIGS. 4 and 5, when the latch catch 62 is coupled to the latch holder 22, the latch spring 86 biases the latch catch 62 along the rails 42 and along the axis 30.

Figure 6:
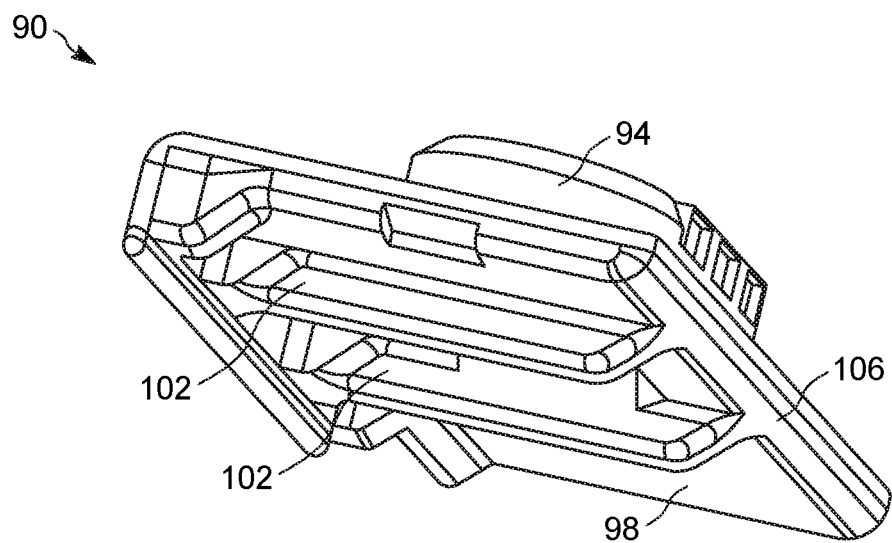
FIG. 6 is a perspective view of a latch button of the latch assembly of FIG. 1.
Figure 7:
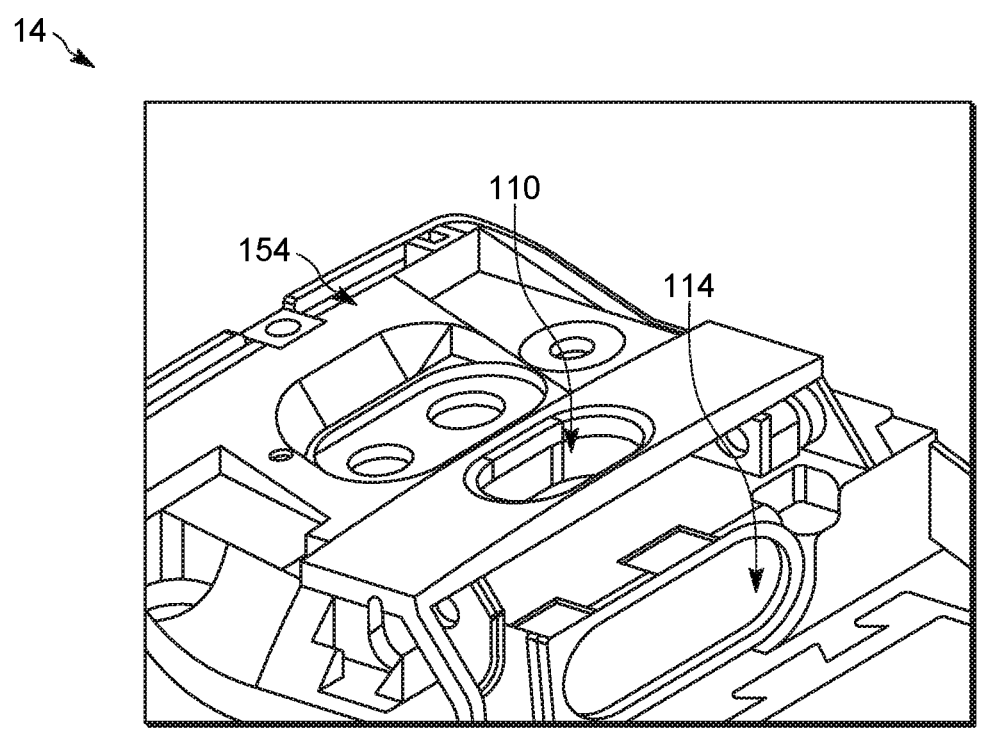
FIG. 7 is a perspective view of a portion of the portable communication device, illustrating a main housing.

With reference to FIG. 6, the latch assembly 10 additionally includes a latch button 90 that couples to the latch catch 62. The latch button 90 includes a top region 94 that is positioned to face away from an interior of the portable communication device 14 once the latch assembly 10 has been installed on the portable communication device 14. The latch button 90 also includes a bottom region 98 disposed opposite the top region 94. The bottom region 98 is positioned to face an interior of the portable communication device 14 once the latch assembly 10 has been installed on the portable communication device 14. The latch button 90 additionally includes two ribs 102 along the bottom region 98, as well as an inclined surface 106. In the illustrated embodiment, the two ribs 102 extend parallel to one another, and the inclined surface 106 is at an end of the latch button 90 adjacent the two ribs 102. Other embodiments include different shapes and sizes for the latch button 90 than that illustrated. For example, in some embodiments the latch button 90 includes only a single rib 102 or more than two ribs 102. In some embodiments the latch button 90 includes grooves in place of the ribs 102, and/or includes an inclined surface 106 that is located in a different location than that illustrated.

Figure 9:
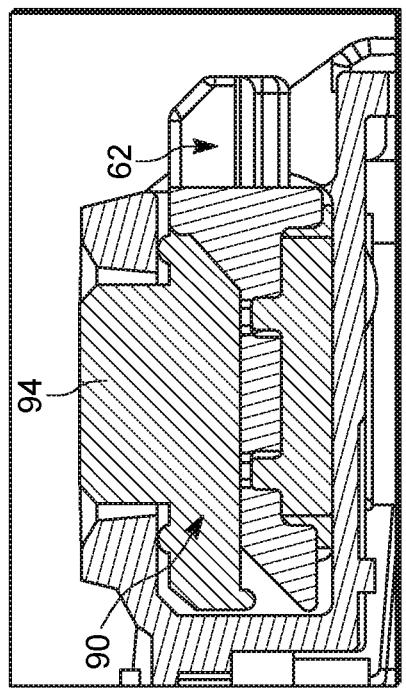
FIGS. 8 and 9 are perspective views of an assembly operation for inserting the latch button into the main housing.
Figure 8:
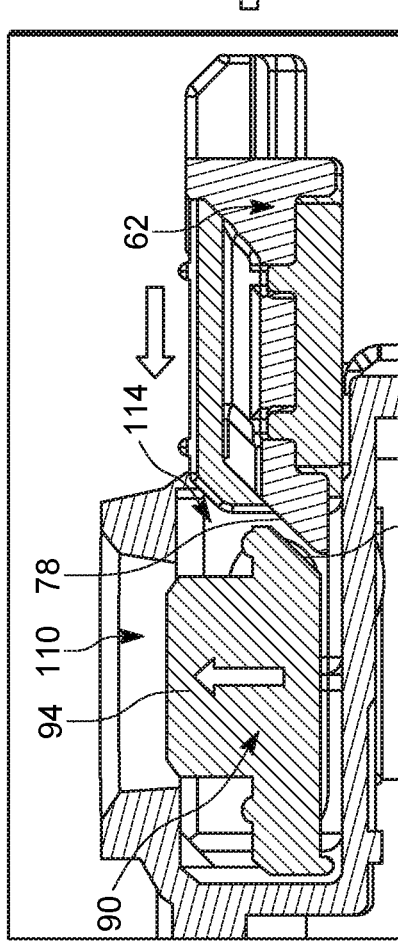

With reference to FIGS. 6-9, in the illustrated embodiment the top region 94 of the latch button 90 is sized and shaped to extend into an aperture 110 in the portable communication device 14, such that at least a portion of the top region 94 extends out of the aperture 110 or is at least accessible within the aperture 110 (for example to a user's fingers). As illustrated in FIGS. 8 and 9, during an assembly operation, the latch button 90 is first inserted (for example, laterally in a first direction) through a separate aperture 114 along the portable communication device 14 until the top region 94 is directly adjacent (for example, below) the aperture 110. The combination of the latch holder 22, the latch catch 62, and the latch spring 86 is then inserted through the separate aperture 114 (for example, again laterally in the first direction) until the inclined surface 78 on the latch catch 62 engages the inclined surface 106 on the latch button 90. As the combination of the latch holder 22, the latch catch 62, and the latch spring 86 is moved farther (for example, laterally in the first direction), the latch button 90 is thereby moved (for example, raised) in a second direction that is perpendicular to the first direction of movement of the latch catch 62 (for example, in a vertical direction as seen in FIGS. 8 and 9). In other words, the inclined surface 106 on the latch button 90 acts as a first inclined surface, and the inclined surface 78 on the latch catch 62 acts as a second inclined surface. The first and second inclined surfaces 106, 78 are arranged such that during an assembly operation of the latch assembly, the latch catch 62 is moved in a first direction until the second inclined surface 78 engages the first inclined surface 106 and raises the latch button 90 in a second direction that is perpendicular to the first direction. Additionally, during this movement the ribs 102 on the latch button 90 slide into the grooves 82 on the latch catch 62, such that the bottom region 98 of the latch button 90 becomes coupled to the latch catch 62, and the top region 94 of the latch button 90 is positioned at least partially within the aperture 110.

Figure 10:
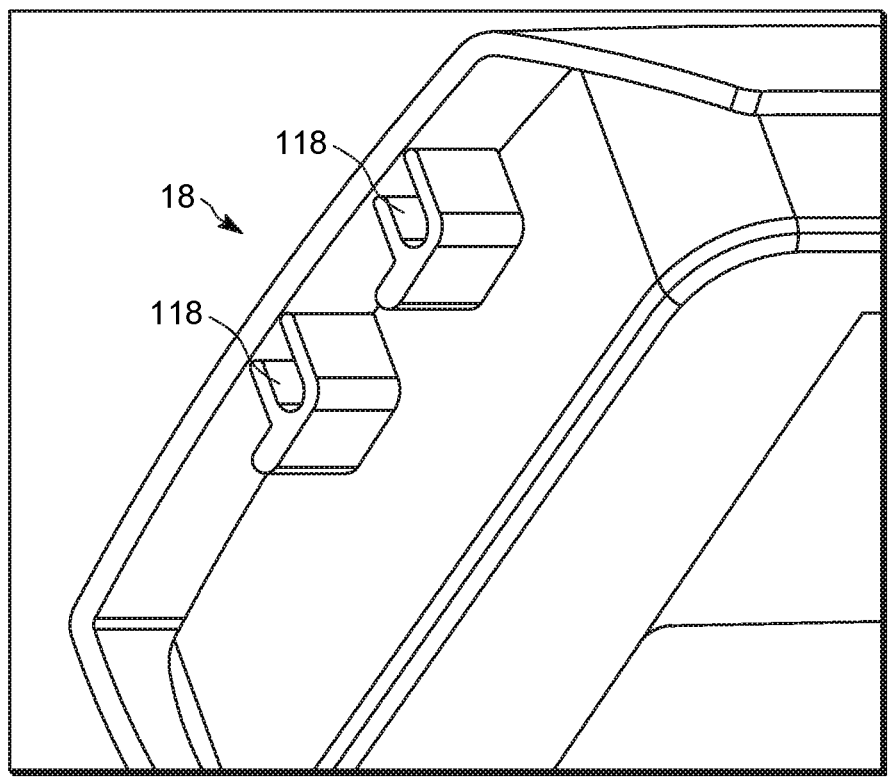
FIG. 10 is a perspective view of an end of a battery for the portable communication device.

With reference to FIG. 6, the aperture 110 defines an elongate slot within which the top region 94 of the latch button 90 may be moved during use (for example, in a third direction that is perpendicular to both the first and second directions described above, and parallel to the axis 30). As illustrated in FIG. 10, the battery 18 includes interface recesses 118. When the top region 94 of the latch button 90 is moved within the aperture 110 along the third direction, the latch catch 62 slides linearly along the axis 30 (for example, with or against the biasing force of the latch spring 86) until the interface protrusions 74 on the latch catch 62 engage and are received in (for example, snap into) the interface recesses 118 of the battery 18 to lock the battery 18 in place. To release the battery 18, the top region 94 of the latch button 90 is moved (for example, by hand) in an opposite direction to the third direction within the aperture 110 (with or against the biasing force of the latch spring 86) until the interface protrusions 74 are released from the interface recesses 118. In other embodiments, the battery 18 may include interface protrusions and the latch catch 62 may include interface recesses.

Figure 11:
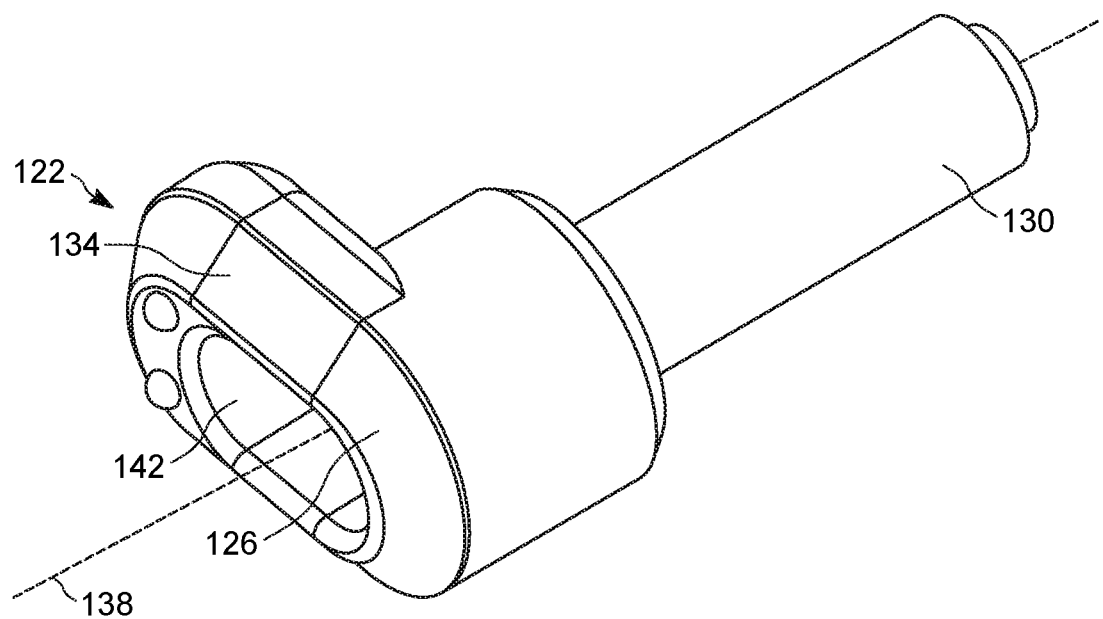
FIG. 11 is a perspective view of a latch pin of the latch assembly of FIG. 1.

With reference to FIGS. 11-15, the latch assembly 10 additionally includes at least one latch pin 122 to removably engage and disengage the latch holder 22 to retain the latch assembly 10 inside the portable communication device 14 and allow removal of the latch assembly 10. In the illustrated embodiment, the latch assembly 10 includes two latch pins 122. The latch pins 122 are non-metallic, although in other embodiments at least a portion of one of the latch pins 122 is metallic. As illustrated in FIG. 11, each latch pin 122 includes a first end 126 and a second, opposite end 130. The first end 126 defines a head region 134 of the latch pin 122, and the second end 130 is configured to removably engage and disengage the latch holder 22 (for example removably engage and disengage the recessed region 46 or the recessed region 54). The latch pin 122 defines an axis 138 (for example, a longitudinal axis) about which the latch pin 122 rotates. In the illustrated embodiment, the axis 138 is parallel to the axis 30 when the latch assembly 10 is fully installed on the portable communication device 14. In other embodiments the axis 138 extends along the axis 30, or is perpendicular to or at an oblique angle to the axis 30.

With continued reference to FIGS. 11-15, the head region 134 is asymmetrical about the axis 138, such that when the latch pin 122 is rotated about the axis 138 a portion of the head region 134 swings from a first rotational position (FIGS. 13 and 15) to a second rotational position (FIG. 14), or vice versa. The first rotational position corresponds to a locked position to retain the latch assembly 10 inside the portable communication device 14, and the second rotational position corresponds to an unlocked position to allow removal of the latch assembly 10. As illustrated in FIG. 11, the head region 134 includes a slot 142 that is sized and shaped to receive a tool (not illustrated) to rotate the latch pin 122 about the axis 138 between the first rotational position and/or the second rotational position. In other embodiments the slot 142 is omitted, or the latch pin 122 includes a protrusion or other structure that is sized and shaped to be engaged by a tool to rotate the latch pin 122.

Figure 12:
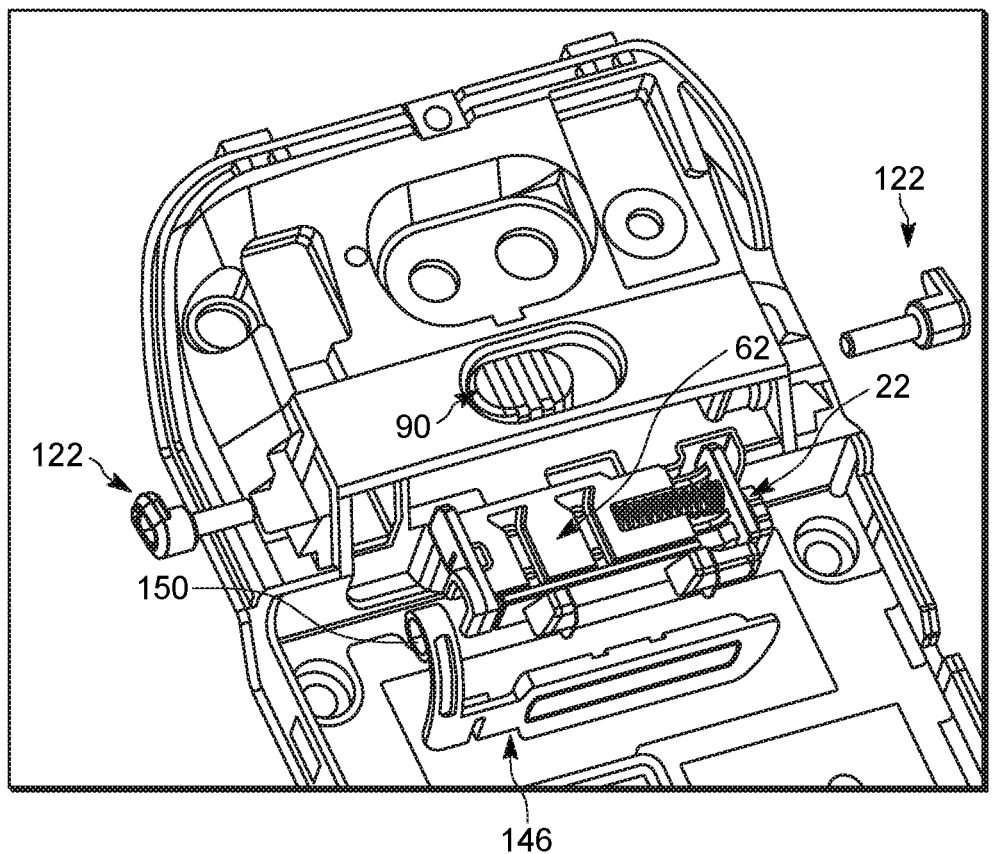
FIG. 12 is a perspective view of the latch assembly of FIG. 1, illustrating two of the latch pins prior to installation of the latch assembly onto the main housing of the portable communication device.
Figure 13:
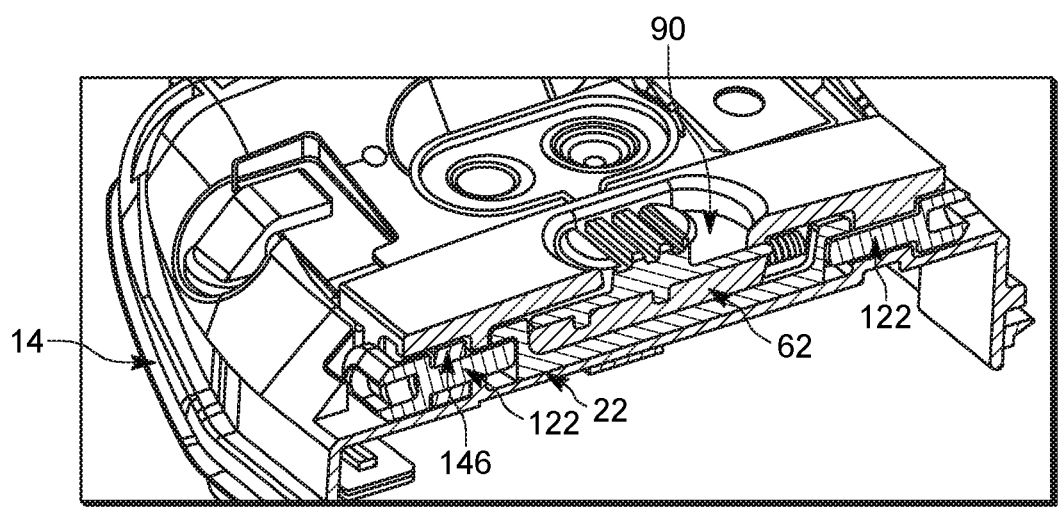
FIG. 13 is a perspective, cross-sectional view of the latch assembly of FIG. 1, illustrating the two latch pins after installation of the latch assembly onto the main housing of the portable communication device.

With reference to FIGS. 12 and 13, in the illustrated embodiment the portable communication device 14 includes an electronic device 146. The electronic device 146 may be a security digital card, a memory card, or another type of electronic device. In the illustrated embodiment the electronic device 146 includes an aperture 150. One of the latch pins 122 passes through the aperture 150 to secure the electronic device 146 to the portable communication device 14. Once the latch pin 122 has passed through the aperture 150, the latch pin 122 removably engages the first end 34 of the latch holder 22, and the other latch pin 122 removably engages the second end 38 of the latch holder 22. In other embodiments, the latch pins 122 do not pass through or otherwise engage an electronic device 146, or the electronic device 146 includes a feature (for example protrusion, recess, and the like) other than the aperture 150 that the latch pin 122 engages in an installed state to secure the electronic device 146 in place within the portable communication device 14.

Figure 14:
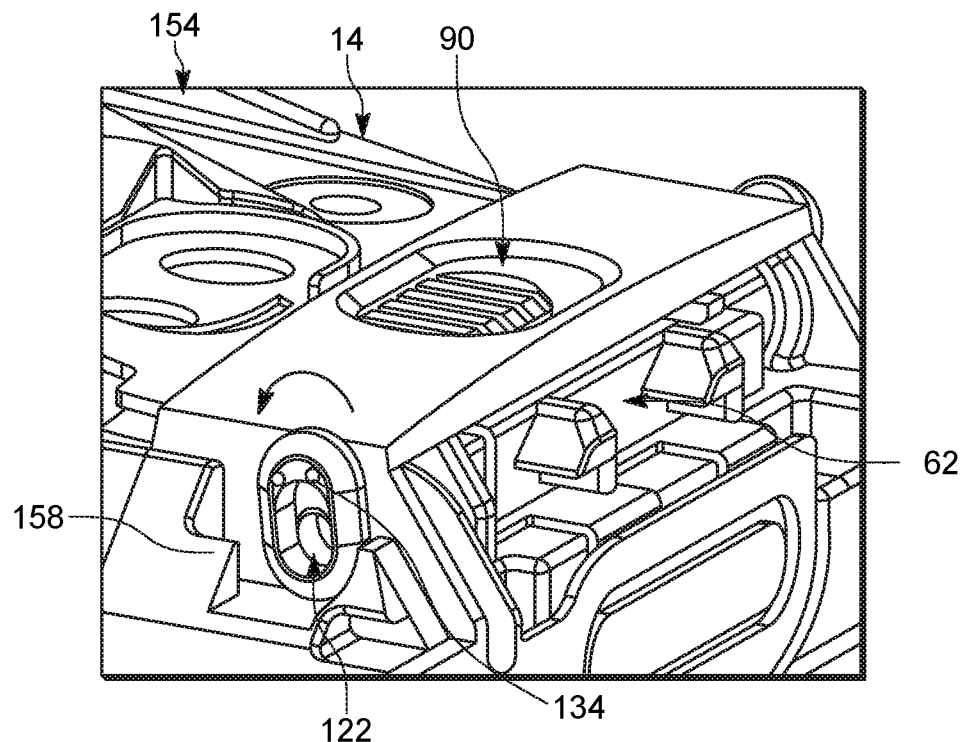
FIGS. 14 and 15 are perspective views of one of the latch pins being rotated.
Figure 15:
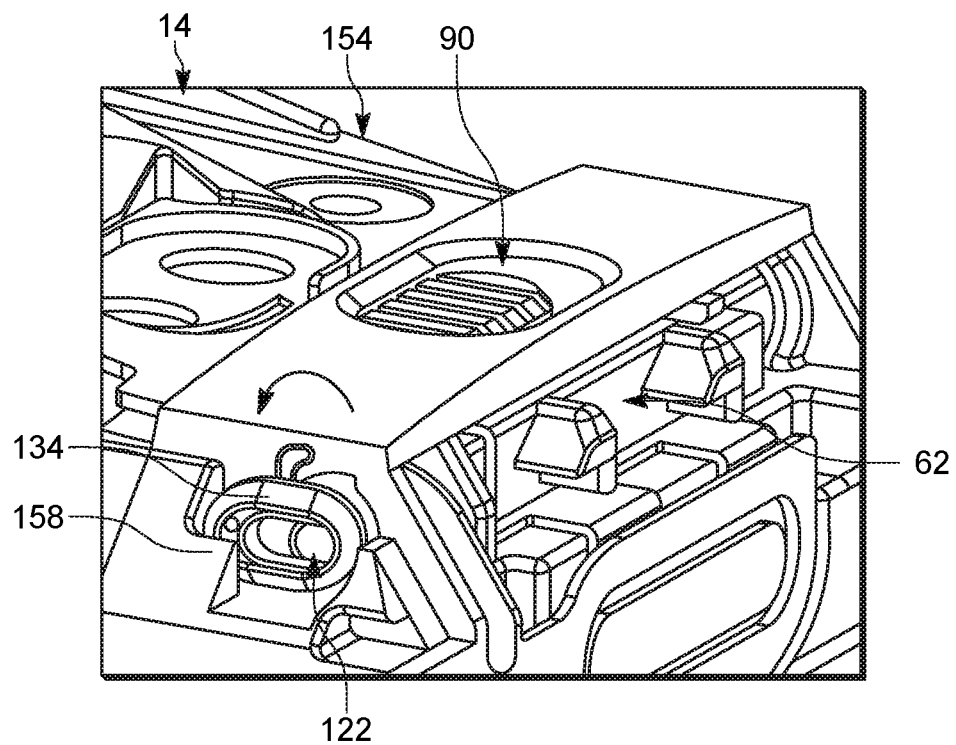

In the example illustrated in FIGS. 14-19, the portable communication device 14 includes a main housing 154. The latch assembly 10 couples to the main housing 154, and the battery 18 releasably couples to the latch assembly 10. The main housing 154 includes an interior wall 158 (FIGS. 14 and 15). Each latch pin 122 rotates (for example 90 degrees) from the first rotational position (FIG. 15) where the interior wall 158 prevents removal of the latch pin 122 from the main housing 154 to the second rotational position (FIG. 14) where the latch pin 122 may be removed from the main housing 154, and vice versa.

With reference to FIGS. 16-19, the portable communication device 14 also includes a back bezel 162 that retains the latch pins 122 within the main housing 154. The back bezel 162 releasably couples to the main housing 154, and extends over at least the head regions 134 of the latch pins 122 to inhibit or prevent the head regions 134 from rotating to the second rotational position (FIG. 14).

Figure 16:
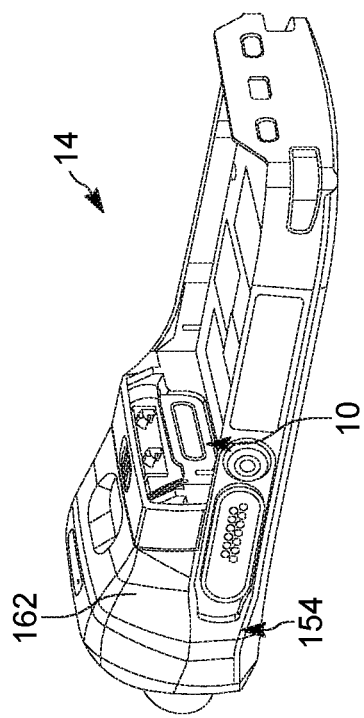
FIGS. 16 and 17 are perspective views of a back bezel of the portable communication device being coupled to the main housing of the portable communication device.
Figure 17:
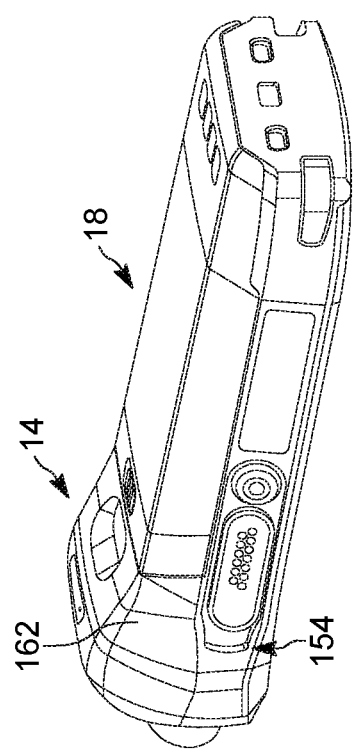
Figure 18:
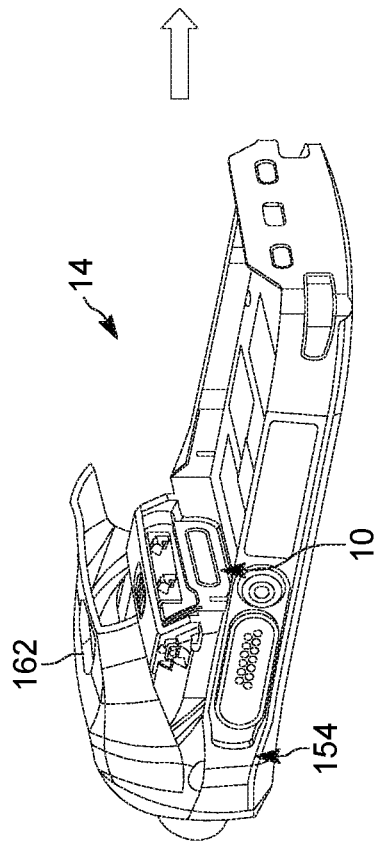
FIGS. 18 and 19 are perspective views of the battery being installed and latched in place on the portable communication device.
Figure 19:
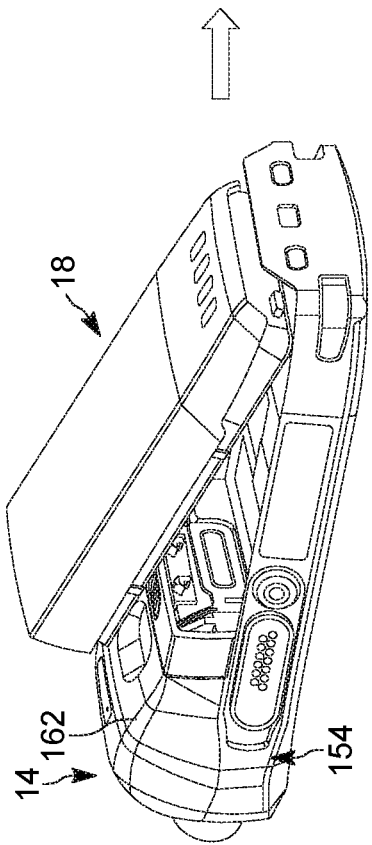

In the illustrated embodiment, if the latch assembly 10 needs to be removed (for example to be serviced or replaced), the battery 18 is first removed by sliding the latch button 90 to unlatch the battery 18. Once the battery 18 is unlatched and removed (FIG. 18), the back bezel 162 is then removed (FIG. 16). The latch pins 122 are then rotated and pulled away from the portable communication device 14 (FIG. 12), releasing the electronic device 146 as well. The latch holder 22, the latch catch 62, and the latch spring 86 are then pulled out of the separate aperture 114 (FIG. 8), and the latch button 90 slides out of the aperture 110 and is then pulled out of the separate aperture 114. A new or repaired latch holder 22, latch catch 62, latch spring 86, and/or button 90 are then installed. The latch pins 122 are then re-inserted (along with the electronic device 146) and rotated (FIGS. 14 and 15). The back bezel 162 is then coupled again to the main housing 154, and the battery 18 is then re-latched in place (FIGS. 16-19).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A latch assembly for latching a battery to a portable communication device, the latch assembly comprising:
   a latch holder having an elongate body defining an axis, wherein the latch holder is a separate element from the portable communication device;
   a latch catch configured to be coupled to the latch holder and to slide linearly relative to the latch holder along the axis;
   a latch spring configured to be coupled to both the latch holder and the latch catch to bias the latch catch along the axis;
   a latch button configured to be coupled to the latch catch; and
   a latch pin configured to removably engage and disengage the latch holder to retain the latch assembly inside the portable communication device and allow removal of the latch assembly from the portable communication device.

2. The latch assembly of claim 1, wherein the body of the latch holder includes a rail, wherein the latch catch includes a groove configured to receive the rail, and wherein the latch catch is configured to slide along the rail.

3. The latch assembly of claim 1, wherein an end of the body of the latch holder includes a recessed region configured to receive a portion of the latch pin when the latch pin is engaged with the latch holder.

4. The latch assembly of claim 1, wherein the latch catch includes an elongate protrusion, and wherein a portion of the latch spring is configured to extend over the elongate protrusion.

5. The latch assembly of claim 1, wherein the latch button includes a top region positioned to face away from an interior of the portable communication device, and a bottom region disposed opposite the top region and positioned to face the interior of the portable communication device.

6. The latch assembly of claim 5, wherein the bottom region of the latch button includes a rib, and wherein the latch catch includes a groove configured to receive the rib.

7. The latch assembly of claim 1, wherein the latch button includes a first inclined surface and the latch catch includes a second inclined surface, wherein the first inclined surface and the second inclined surface are arranged such that during an assembly operation of the latch assembly the latch catch is moved in a first direction until the second inclined surface engages the first inclined surface and raises the latch button in a second direction that is perpendicular to the first direction.

8. The latch assembly of claim 1, wherein the latch pin includes a first end and a second, opposite end, wherein the first end of the latch pin defines a head region of the latch pin, and wherein the second end is configured to engage and disengage the latch holder.

9. The latch assembly of claim 8, wherein the axis is a first axis, wherein the latch pin defines a second axis, wherein the latch pin is configured to be rotated about the second axis.

10. The latch assembly of claim 9, wherein the first axis is parallel to the second axis.

11. The latch assembly of claim 9, wherein the head region of the latch pin is asymmetrical about the axis, such that when the latch pin is rotated about the second axis, a portion of the head region swings from a first rotational position to a second rotational position.

12. The latch assembly of claim 11, wherein the first rotational position is configured to correspond to a locked position to retain the latch assembly inside the portable communication device, and wherein the second rotational position is configured to correspond to an unlocked position to allow removal and servicing of the latch assembly.

13. The latch assembly of claim 9, wherein the head region defines a slot configured to receive a tool to rotate the latch pin about the second axis.

14. The latch assembly of claim 1, wherein the latch pin is a first latch pin, wherein the latch assembly further includes a second latch pin, wherein the first latch pin is configured to removably engage a first end of the latch holder, and the second latch pin is configured to removably engage a second, opposite end of the latch holder.

15. The latch assembly of claim 1, wherein the latch pin is non-metallic.

16. The latch assembly of claim 1, further comprising an electronic device selected from of a group consisting of a security digital card and a memory card, wherein the electronic device includes an aperture, and wherein the latch pin is configured to pass through the aperture to secure the electronic device to the portable communication device.

17. A portable communication device comprising:
   a main housing;
   the latch assembly of claim 1, wherein the latch assembly is coupled to the main housing; and
   a battery releasably coupled to the latch assembly.

18. The portable communication device of claim 17, wherein the main housing includes an interior wall, wherein the latch pin is configured to be rotated from a first rotational position where the interior wall prevents removal of the latch pin from the main housing to a second rotational position where the latch pin configured to be removed from main housing.

19. The portable communication device of claim 17, further comprising a back bezel configured to retain the latch pin within the main housing.

20. The portable communication device of claim 17, wherein the latch catch of the latch assembly includes an interface protrusion, and wherein the battery includes an interface recess configured to receive the interface protrusion when the latch catch slides linearly along the axis.

21. The portable communication device of claim 1, wherein the latch spring is a coil spring configured to extend and retract along the axis.

* * * * *